(12) United States Patent
Panchal (10) Patent No.: US 9,503,247 B2
(45) Date of Patent: Nov. 22, 2016

(54) CARRIER AGGREGATION MANAGEMENT

(71) Applicant: Verizon Patent and Licensing Inc., Arlington, VA (US)

(72) Inventor: Jignesh S. Panchal, Somerset, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 230 days.

(21) Appl. No.: 14/283,862

(22) Filed: May 21, 2014

(65) Prior Publication Data

US 2015/0341945 A1 Nov. 26, 2015

(51) Int. Cl.
*H04L 5/00* (2006.01)
*H04W 72/08* (2009.01)
*H04W 72/04* (2009.01)

(52) U.S. Cl.
CPC ............. *H04L 5/0098* (2013.01); *H04L 5/001* (2013.01); *H04L 5/003* (2013.01); *H04W 72/0453* (2013.01); *H04W 72/085* (2013.01)

(58) Field of Classification Search
CPC .......... H04L 5/0098; H04W 72/0453; H04W 72/085
See application file for complete search history.

(56) References Cited

U.S. PATENT DOCUMENTS

| | | | | |
|---|---|---|---|---|
| 2012/0058797 A1* | 3/2012 | Gaal | ..................... | H04W 52/44 455/522 |
| 2012/0099464 A1* | 4/2012 | Chun | ....................... | H04L 5/00 370/252 |
| 2013/0034018 A1* | 2/2013 | Wei | .................... | H04W 72/0453 370/254 |
| 2013/0100931 A1* | 4/2013 | Kim | ........................ | H04L 5/001 370/331 |
| 2013/0136015 A1* | 5/2013 | Ojala | ..................... | H04L 5/001 370/252 |
| 2013/0201834 A1* | 8/2013 | Klingenbrunn | ........ | H04W 28/12 370/236 |
| 2013/0259003 A1* | 10/2013 | Kwon | ................... | H04W 36/08 370/331 |
| 2014/0016593 A1* | 1/2014 | Park | ........................ | H04L 5/001 370/329 |
| 2015/0172987 A1* | 6/2015 | Balakrishnan | ........ | H04W 36/24 370/331 |

* cited by examiner

*Primary Examiner* — Omer S Mian (57) ABSTRACT

A computer device may include logic configured to configure carrier aggregation for a user equipment serviced by the base station device; activate a secondary component carrier for the user equipment; determine that a quality level for the secondary component carrier is lower than a quality threshold; and de-activate the secondary component carrier for the user equipment, in response determining that the quality level is lower than the quality threshold. The logic may be further configured to detect a problem associated with the primary component carrier for the user equipment; determine whether a better primary component carrier is available, in response to detecting the problem; switch to the better primary component carrier, when the better primary component carrier is available; and de-configure carrier aggregation for the user equipment, when the better primary component carrier for the user equipment is not available.

20 Claims, 8 Drawing Sheets

CARRIER AGGREGATION MANAGEMENT

BACKGROUND INFORMATION

Mobile communication devices connect to a wireless access network via a base station. A base station may include a radio frequency (RF) transceiver configured to receive wireless signals from a mobile communication device and to transmit wireless signals to the mobile communication device. A base station may communicate with a large number of mobile communication devices. The large number of mobile communication devices may tax the resources of the base station.

DETAILED DESCRIPTION OF PREFERRED EMBODIMENTS

The following detailed description refers to the accompanying drawings. The same reference numbers in different drawings identify the same or similar elements.

Figure 1:
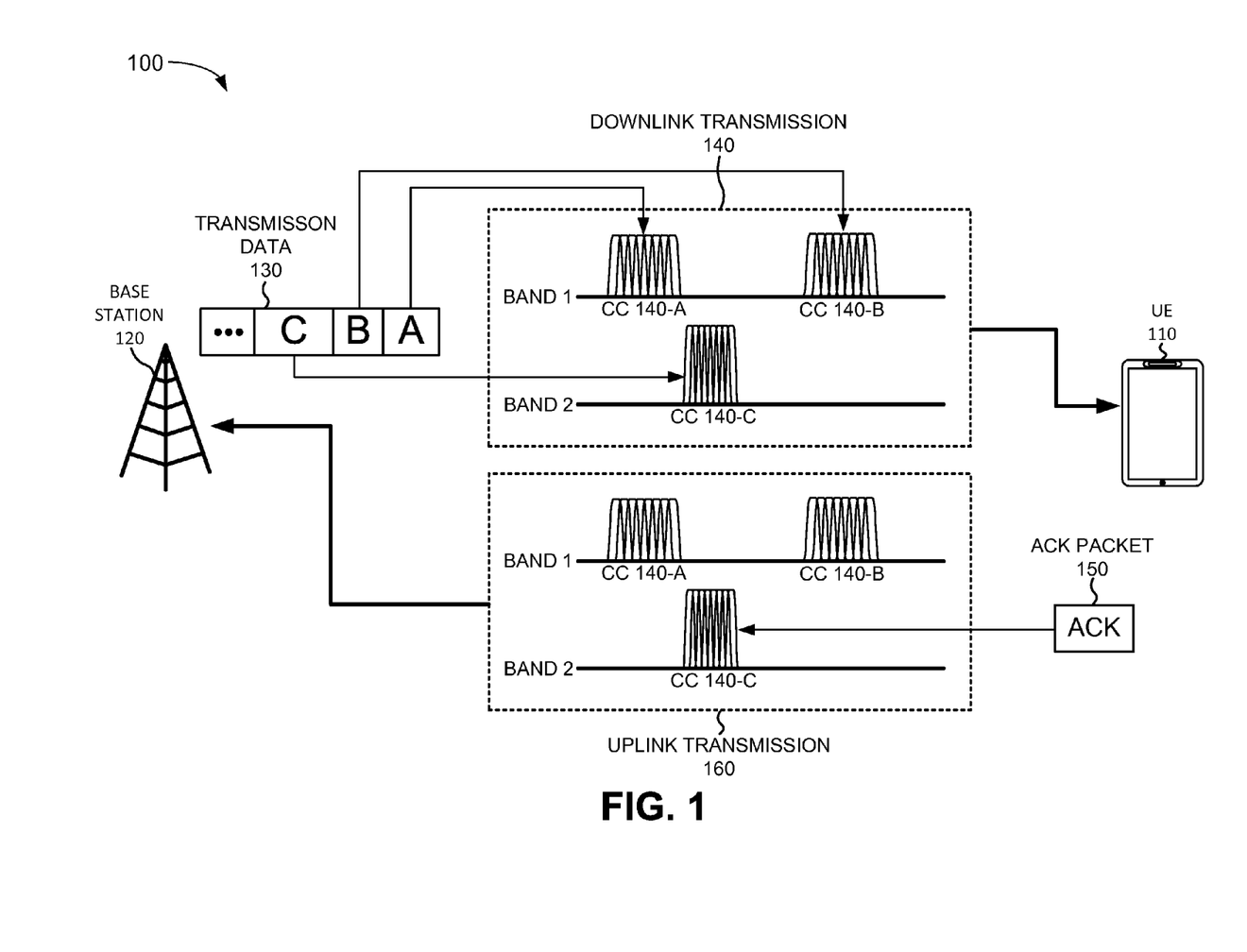
FIG. 1 is a diagram illustrating a downlink carrier aggregation process according to an implementation described herein.

Implementations described herein relate to carrier aggregation management. Carrier aggregation is feature a wireless access network may use to increase bandwidth by using multiple downlink communication channels, referred to as component carriers. The downlink carrier aggregation may increase peak and average throughput on a downlink shared channel by aggregating two or more carriers' bandwidths and thus increasing effective downlink bandwidth. FIG. 1 is a diagram illustrating a carrier aggregation process 100 according to an implementation described herein. As shown in FIG. 1, downlink carrier aggregation process 100 may include user equipment (UE) 110 communicating with a base station 120. Base station 120 may receive transmission data 130 and may transmit transmission data 130 to UE 110.

Base station 120 (also referred to herein as eNodeB 120) may be configured to use multiple transmission bands such as, for example, any of Evolved Universal Terrestrial Radio Access (E-UTRA) bands 1 through 44 (e.g., the Advanced Wireless Services (AWS) band, the 700C band, the Personal Communications Service (PCS) band, the Cellular 850 band, etc.). Each band may include multiple carriers. A carrier may also be referred to as a channel. UE 110 may also be configured to use multiple carriers and/or multiple bands. Furthermore, UE 110 may be enabled to use carrier aggregation and base station 120 may recognize that UE 110 is enabled to user carrier aggregation and may configure UE 110 for carrier aggregation.

Carrier aggregation may include intra-band contiguous aggregation, in which two contiguous components carriers are used in the same band; may use intra-band non-contiguous aggregation, in which two components carriers in the same band are non-contiguous (i.e., separated by one or more other component carriers); may use inter-band aggregations, in which two component carriers in separate bands are used; and/or may use any combination thereof.

Carrier aggregation process 100 illustrates downlink transmission 140 from base station 120 to UE 110 and uplink transmission 150 from UE 110 to base station 120. Carrier aggregation process 100 includes a primary component carrier 140-C and two secondary component carriers 140-A and 140-B. The primary component carrier is the carrier which also includes uplink communication from UE 110 to base station 120. The secondary component carriers only carry downlink data. As shown in FIG. 1, transmission data 130 divided into sequential blocks A, B and C. Block A is transmitted via first secondary component carrier 140-A, block B is transmitted via second secondary component carrier 140-B, and block C is transmitted via primary component carrier 140-C. This process may be repeated with subsequent transmission blocks in transmission data 130. In this example, secondary component carriers 140-A and 140-B are non-contiguous carriers in the same band, while primary component carrier 140-C is in a different band.

UE 110 may respond with an acknowledgement packet 150 via uplink of primary component carrier 140-C. UE 110 may send acknowledgement packet 150 for each transmitted segment via uplink of primary component carrier. Thus, for blocks A, B, and C sent via component carriers 140-A, 130-B, and 140-C, UE 110 may send three acknowledgement packets 150 via primary component carrier 140-C. While FIG. 1 illustrates two secondary component carriers, in other implementations, carrier aggregation process 110 may include only one secondary component carrier or more than two secondary component carriers. Furthermore, the secondary component carriers may be intra-band and contiguous, or non-contiguous, with the primary component carrier; in a different band than the primary component carrier while being intra-band and contiguous, or non-contiguous, with each other; may each be in a different band; and/or any combination thereof.

While carrier aggregation may provide increased bandwidth and/or throughput for UE 110, configuring carrier aggregation may negatively impact performance. When carrier aggregation is configured on UE 110, UE 110 may be required to transmit an acknowledgement (ACK), or a non-acknowledgement (NACK), via a Physical Uplink Control Channel (PUCCH) of primary component carrier for each downlink component carrier transmission. Sending multiple ACKs/NACKs messages may require extra power and may impact the uplink power budget. Furthermore, UE 110 may be required to transmit an acknowledgement (ACK), or a non-acknowledgement (NACK), via a Physical Uplink Shared Channel (PUSCH) of primary component carrier for each downlink component carrier transmission. These multiple ACKs/NACKs may increase code rates on the PUSCH, an uplink channel shared by all UEs communicating with base station 120, making it harder to decode PUSCH messages and impacting PUSCH coverage.

In addition, if carrier aggregation is configured and then activated for UE 110, UE 110 has to then decode the Physical Downlink Control Channel (PDCCH) for all component carriers involved in the carrier aggregation and report Channel State Information (CSI) for all carriers via the uplink of primary component carrier, using the PUCCH and the PUSCH. This additional decoding and transmission of CSI leads to increased consumption of battery power for UE 110. Thus, management of carrier aggregation may improve service performance, coverage and conserve battery power for UE 110.

Implementations described herein relate to configuring carrier aggregation for UE 110 serviced by base station 120, activating a secondary component carrier for the user equipment, and monitoring a downlink quality level for the secondary component carrier. The quality level may be determined based on an error rate measured for the secondary component carrier. For example, the error rate may be measured using residual block error rate (rBLER) for the secondary component carrier. The rBLER is defined as a ratio of number of last retransmissions in error over total number of first transmissions. The block error rate may correspond to the ratio of the number of erroneous blocks of data to the total number of received blocks of data. If the base station determines that the downlink quality level of the secondary component carrier is lower than a quality level threshold (e.g., higher than a maximum rBLER), the base station may de-activate the secondary component carrier for UE 110. The base station may perform this process of monitoring the quality level, and de-activating the secondary component carrier if the downlink quality level drops below the quality level threshold, for each secondary component carrier activated for UE 110.

Moreover, base station 120 may instruct UE 110 to report one or more quality values, such as a Reference Signal Received Power (RSRP) and/or Reference Signal Received Quality (RSRQ) and to report these values for each secondary component carrier and/or the primary component carrier. If a quality value goes below a threshold, base station 120 may determine that UE 110 has enter into a coverage alarm for a secondary component carrier and may de-activate the secondary component carrier. If the value later goes above the threshold, base station 120 may re-activate the secondary component carrier. Base station 120 may also select to de-activate or re-activate a secondary component carrier based on an estimated channel quality of a physical downlink control channel (PDCCH) and/or a physical downlink shared channel (PDSCH) based on the UE's channel state information.

Furthermore, base station 120 may monitor the primary component carrier for UE 110. Base station 120 may instruct UE 110 to report one or more quality values, such as a Reference Signal Received Power (RSRP) and/or Reference Signal Received Quality (RSRQ) and to report these values for the primary component carrier. If base station 120 may detect a problem with the primary component carrier for UE 110 (i.e. the quality value goes below a threshold), may determine whether a better primary component carrier is available for UE 110, and may switch to the better primary component carrier, if available. In some embodiments, base station 120 may detect a problem for the primary component carrier if, for example, downlink rBLER level for the downlink of the primary component carrier is lower than a downlink quality threshold (e.g., higher than a maximum downlink rBLER); if a load level for the downlink and/or uplink for the primary component carrier is higher than a load level threshold; and/or if an uplink quality level for the uplink of the primary component carrier is lower than an uplink quality threshold (e.g., higher than a maximum uplink rBLER). If base station 120 determines that a better primary component carrier is not available for UE 110 in response to detecting the problem with the primary component carrier, base station 120 may de-configure carrier aggregation for UE 110. De-configuration of carrier aggregation for UE 110 may bring UE 110 into single carrier mode.

UE 110 may be configured or re-configured for carrier aggregation when Radio Resource Control (RRC) becomes active from an idle state. Furthermore, UE 110 may be configured or re-configured for carrier aggregation when UE 110 is handed over from another base station to base station 120 due to mobility, coverage, or load balancing triggers. The criteria for carrier aggregation configuration may include hardware capability of UE 110 to support carrier aggregation, including how many secondary component carriers both UE 110 and base station 120 are configured to support. For example, if base station 120 supports a maximum of n component carriers, but UE 110 only supports up to m component carriers, where m<n, then there can be a maximum of m component carriers involved in a carrier aggregation process between UE 110 and base station 120. Other UEs may support more component carriers (e.g., up to n) and may have up to n component carrier active when attached to base station 120.

Figure 2:
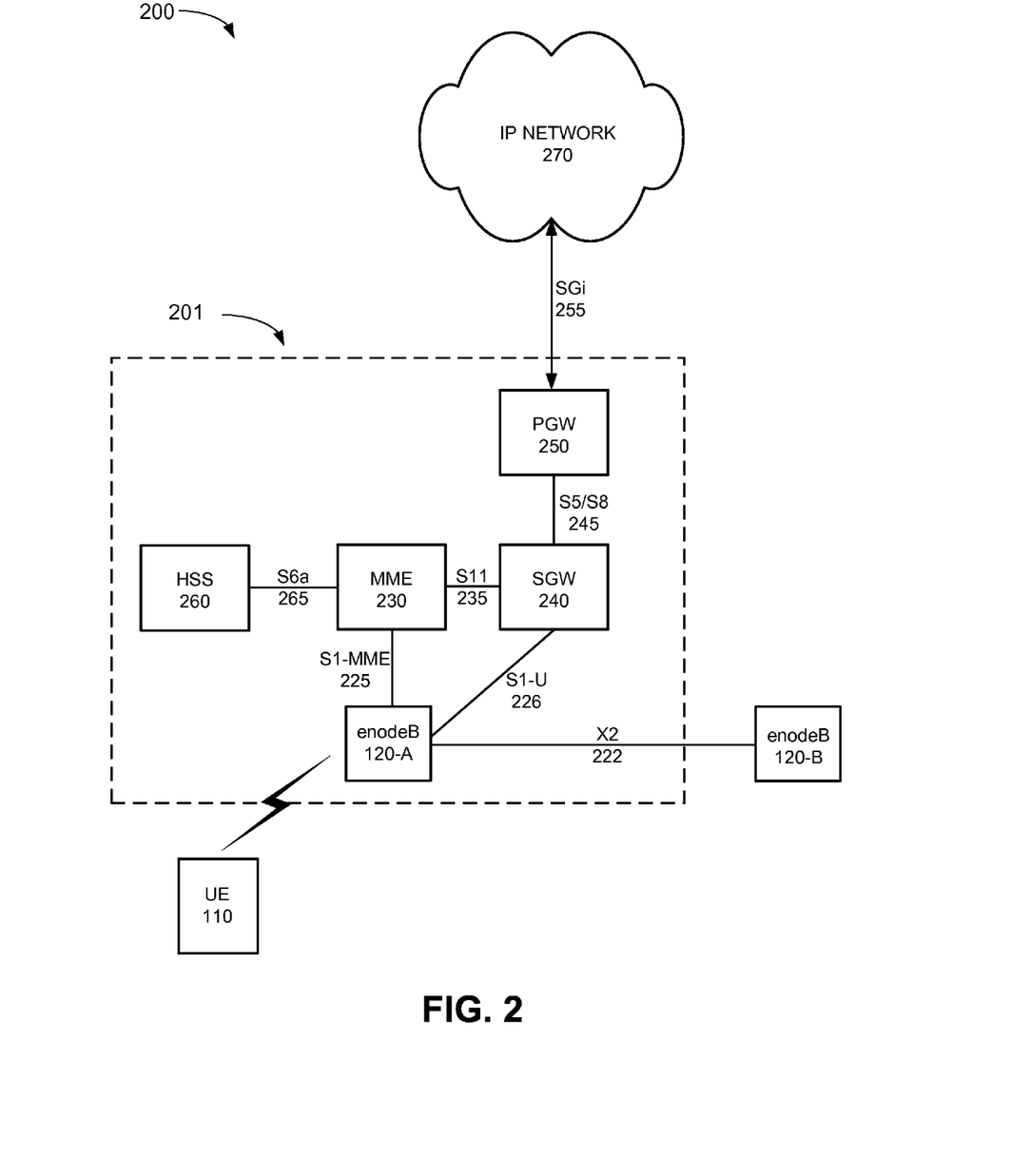
FIG. 2 is a diagram illustrating an environment according to an implementation described herein.

FIG. 2 is a diagram illustrating example components of a system 200 according to an implementation described herein. As shown in FIG. 2, system 200 may include UE 110, an access network 201, and an Internet Protocol (IP) network 270. Access network 201 may correspond to a Long Term Evolution (LTE) access network. Access network 201 may include one or more devices that implement logical entities interconnected via standardized interfaces, and that provide wireless packet-switched services and wireless IP connectivity to user devices for both data and voice services. Access network 201 may include eNodeB 120 (corresponding to base station 120), a mobility management entity (MME) device 230, a serving gateway (SGW) device 240, a packet data network gateway (PGW) device 250, and a home subscriber server (HSS) device 260. While FIG. 2 depicts a single UE 110, eNodeB 120, MME device 230, SGW 240, PGW 250, HSS device 260, and external IP network 270 for illustration purposes, in other implementations FIG. 2 may include multiple UEs 110, eNodeBs 120, MME devices 230, SGWs 240, PGWs 250, HSS devices 260, and/or external IP networks 270.

eNodeB 120 may include one or more devices (e.g., base stations) and other components and functionality that allow UE 110 to wirelessly connect to access network 201. eNodeB 120 may interface with access network 201 via an interface referred to as an S1 interface, which may be split into a control plane S1-MME interface 225 and a data place S1-U interface 226. S1-MME interface 225 may interface with MME device 230. S1-MME interface 225 may be implemented, for example, with a protocol stack that includes a Network Access Server (NAS) protocol and/or Stream Control Transmission Protocol (SCTP). An S1-U interface 226 may interface with SGW 240 and may be implemented, for example, using a General Packet Radio Service Tunneling Protocol version 2 (GTPv2). eNodeB 120-A may communicate with eNodeB 120-B via an X2 interface 222. X2 interface 222 may be implemented, for example, with a protocol stack that includes an X2 application protocol and SCTP.

MME device 230 may implement control plane processing for access network 201. For example, MME device 230 may implement tracking and paging procedures for UE 110, may activate and deactivate bearers for UE 110, may authenticate a user of UE 110, and may interface to non-LTE radio access networks. A bearer may represent a logical channel with particular quality of service (QoS) requirements. MME device 230 may also select a particular SGW 240 for a particular UE 110. A particular MME device 230 may interface with other MME devices 230 in access network 201 and may send and receive information associated with UEs, which may allow one MME device to take over control plane processing of UEs serviced by another MME device, if the other MME device becomes unavailable.

SGW 240 may provide an access point to and from UE 110, may handle forwarding of data packets for UE 110, and may act as a local anchor point during handover procedures between eNodeBs 220. SGW 240 may interface with PGW 250 through an S5/S8 interface 245. S5/S8 interface 245 may be implemented, for example, using GTPv2.

PGW 250 may function as a gateway to IP network 270 through an SGi interface 155. IP network 270 may include, for example, an IP Multimedia Subsystem (IMS) network, which may provide voice and multimedia services to UE 110, based on Session Initiation Protocol (SIP). A particular UE 110, while connected to a single SGW 240, may be connected to multiple PGWs 250, one for each packet network with which UE 110 communicates.

MME device 230 may communicate with SGW 240 through an S11 interface 235. S11 interface 235 may be implemented, for example, using GTPv2. S11 interface 235 may be used to create and manage a new session for a particular UE 110. S11 interface 235 may be activated when MME device 230 needs to communicate with SGW 240, such as when the particular UE 110 attaches to access network 201, when bearers need to be added or modified for an existing session for the particular UE 110, when a connection to a new PGW 250 needs to created, or during a handover procedure (e.g., when the particular UE 110 needs to switch to a different SGW 240).

HSS device 260 may store information associated with UEs 140 and/or information associated with users of UEs 140. For example, HSS device 260 may store user profiles that include authentication and access authorization information. MME device 230 may communicate with HSS device 260 through an S6a interface 265. S6a interface 265 may be implemented, for example, using a Diameter protocol.

Although FIG. 2 shows exemplary components of system 200, in other implementations, system 200 may include fewer components, different components, differently arranged components, or additional components than depicted in FIG. 2. Additionally or alternatively, one or more components of system 200 may perform functions described as being performed by one or more other components of system 200.

Figure 3:
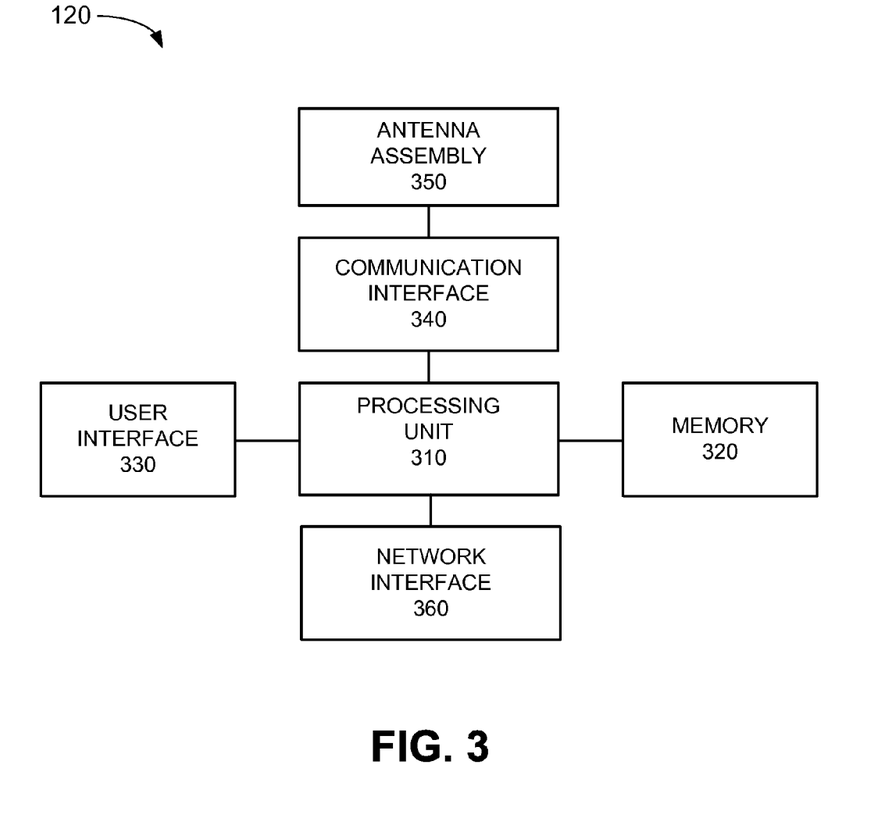
FIG. 3 is a diagram illustrating exemplary components of the eNodeB of FIG. 1.

FIG. 3 is a diagram illustrating example components of eNodeB 120 according to an implementation described herein. As shown in FIG. 3, eNodeB 120 may include a processing unit 310, a memory 320, a user interface 330, a communication interface 340, an antenna assembly 350, and a network interface 360.

Processing unit 310 may include one or more processors, microprocessors, application specific integrated circuits (ASICs), field programmable gate arrays (FPGAs), and/or other processing logic. Processing unit 310 may control operation of eNodeB 120 and its components.

Memory 320 may include a random access memory (RAM) or another type of dynamic storage device, a read only memory (ROM) or another type of static storage device, a removable memory card, and/or another type of memory to store data and instructions that may be used by processing unit 310.

User interface 330 may include mechanisms for inputting information to eNodeB 120 and/or for outputting information from eNodeB 120. Examples of input and output mechanisms might include a speaker to receive electrical signals and output audio signals; a microphone to receive audio signals and output electrical signals; buttons (e.g., a joystick, control buttons, a keyboard, or keys of a keypad) and/or a touchscreen to permit data and control commands to be input into eNodeB 120; a display, such as an LCD, to output visual information; and/or any other type of input or output device. In some embodiments, eNodeB 120 may be managed remotely and may not include user interface 330. In other words, eNodeB 120 may be "headless" and may not include an input device and/or an output device.

Communication interface 340 may include one or more RF transceivers that enable eNodeB 120 to communicate with UEs 140 via wireless communications. An RF transceiver may include an RF transmitter that receives signals to be transmitted wirelessly and performs signal processing on the signals before providing the signals to antenna assembly 350, and an RF receiver that receives signals from antenna assembly 350 and performs signal processing on the received signals before providing the received signals to processing unit 310. For example, the RF transceiver may perform analog-to-digital and digital-to-analog conversion, modulation and demodulation, up-conversion and down-conversion, and/or amplification of signals.

Antenna assembly 350 may include one or more antennas to transmit and/or receive RF signals over the air. Antenna assembly 350 may, for example, receive RF signals from communication interface 340 and transmit the signals over the air and receive RF signals over the air and provide them to communication interface 340.

Network interface 360 may include a logical component that includes input and/or output ports, input and/or output systems, and/or other input and output components that facilitate the transmission of data to other devices via a backhaul link. For example, network interface 360 may include a network interface card (e.g., Ethernet card) for wired communications and/or a wireless network interface (e.g., a WiFi) card for wireless communications. Network interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As described herein, eNodeB 120 may perform certain operations in response to processing unit 310 executing software instructions contained in a computer-readable medium, such as memory 320. A computer-readable medium may be defined as a non-transitory memory device. A non-transitory memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hard-wired circuitry may be used in place of, or in combination with, software instructions to implement processes described herein. Thus, implementations described herein are not limited to any specific combination of hardware circuitry and software.

Although FIG. 3 shows example components of eNodeB 120, in other implementations, eNodeB 120 may include fewer components, different components, differently arranged components, or additional components than those depicted in FIG. 3. Additionally or alternatively, one or more components of eNodeB 120 may perform the tasks described as being performed by one or more other components of eNodeB 120.

Figure 4:
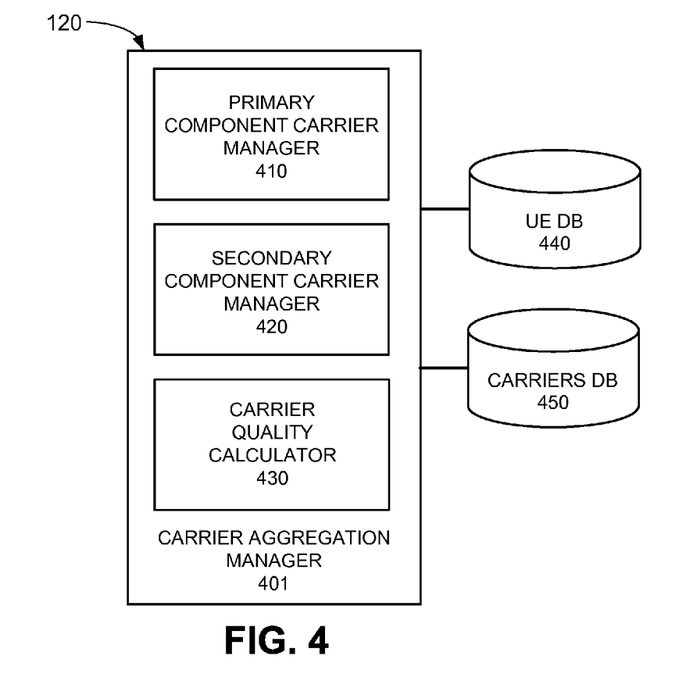
FIG. 4 is a diagram illustrating exemplary functional components of the eNodeB of FIG. 1.

FIG. 4 is a diagram illustrating exemplary functional components of eNodeB 120 according to a first implementation described herein. The functional components of eNodeB 120 may be implemented, for example, via processing unit 310 executing instructions from memory 320. Alternatively, some or all of the functional components of eNodeB 120 may be implemented via hard-wired circuitry. As shown in FIG. 4, eNodeB 120 may include a carrier aggregation manager 401, a UE database (DB) 440, and a carriers DB 450.

Carrier aggregation manager 401 may manage carrier aggregations for UEs 110 communicating with eNodeB 120. For example, carrier aggregation manager 401 may configure carrier aggregation for UE 110 and/or may de-configure carrier aggregation for UE 110. Carrier aggregation manager 401 may include a primary component carrier manager 410, a secondary component carrier manager 420, and a carrier quality calculator 430.

Primary component carrier manager 410 may manage the primary component carrier for UEs 110 serviced by base station 110. For example, primary component carrier manager 410 may select a particular primary component carrier from among a number of available primary component carriers. Furthermore, primary component carrier manager 410 may monitor the primary component carrier and may detect problems associated with the primary component carrier. When a problem with the primary component carrier is detected, primary component carrier manager 410 may determine whether a better primary component carrier is available for UE 110. If a better primary component carrier is available for UE 110, primary component carrier manager 410 may switch to the better primary component carrier. Otherwise, primary component carrier manager 410 may instruct carrier aggregation manager 401 to de-configure carrier aggregation for UE 110.

Secondary component carrier manager 420 may manage secondary component carriers for UEs 110 serviced by base station 110. For example, secondary component carrier manager 420 may select and activate one or more secondary component carriers for UE 110. For each activated secondary component carrier for UE 110, secondary component carrier 420 may monitor a quality of the activated secondary component carrier and may de-activate the secondary component carrier if the quality level is too low (e.g., below a quality level threshold).

Carrier quality calculator 430 may determine the quality level for a component carrier for a particular UE 110. For example, carrier quality calculator 430 may determine a downlink rBLER value, an RSRP/RSRQ for a component carrier, an uplink rBLER value, residual bit error rate (RBER), UE power head room (PHR), estimated uplink path loss, and/or another measure of quality level. Furthermore, carrier quality calculator 430 may determine other BLER criteria, such as an initial or first transmission BLER, a second transmission BLER, and/or other transmission BLER measurements.

UE DB 440 may store carrier aggregation information relating to UEs 110 serviced by base station 120. Exemplary information that may be stored in UE DB 440 is described below with reference to FIG. 5.

Carriers DB 450 may store information relating to bands and carriers which eNodeB 120 is configured to use. For example, carriers DB 450 may include information identifying particular bands and/or particular carriers in each band. Furthermore, carriers DB 450 may identify a load level associated with each band and/or carrier. A load level may be identified based on a number of UE sessions associated with a band and/or carrier, based on a load capacity associated with a band and/or carrier, based on a number of available resource blocks for a band and/or carrier, and/or based on another measure. Moreover, carriers DB 450 may store additional information associated with a band and/or carrier, such as an effective range from base station 120, historical information identifying the frequency with which particular bands and/or carriers have been used by base station 120, and/or other types of information. Furthermore, carriers DB 450 may store one or more quality level threshold and/or load level threshold for particular bands and/or carriers.

Although FIG. 4 shows exemplary functional components of eNodeB 120, in other implementations, eNodeB 120 may include fewer functional components, different functional components, differently arranged functional components, or additional functional components than depicted in FIG. 4. Additionally or alternatively, one or more functional components of eNodeB 120 may perform functions described as being performed by one or more other functional components of eNodeB 120.

Figure 5:
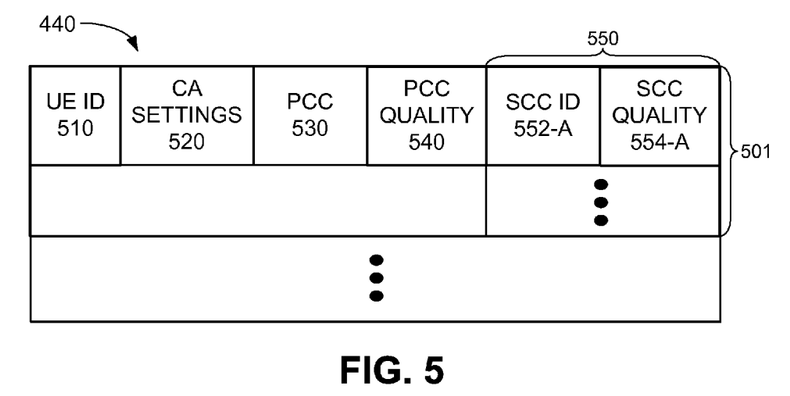
FIG. 5 is a diagram illustrating exemplary components that may be stored in the user equipment database of FIG. 4.

FIG. 5 is a diagram illustrating exemplary components that may be stored in UE DB 440 according to an implementation described herein. As shown in FIG. 5, UE DB can include one or more UE records 501. Each UE record 501 may store information relating to a particular carrier aggregation enabled UE 110 serviced by eNodeB 120. UE record 501 may include a UE ID field 510, a carrier aggregation settings field 520, a primary component carrier field 530, a primary component carrier quality field 540, and one or more second component carrier fields 550.

UE ID field 510 may store information identifying a particular UE 110. For example, UE ID field 510 may include a Mobile Subscriber Integrated Services Digital Network number (MSISDN), an International Mobile Subscriber Identity (IMSI) number, a mobile identification number (MIN), an International Mobile Equipment Identifier (IMEI), an Integrated Circuit Card Identifier (ICCI), a Global Unique Temporary Identifier (GUTI), an Internet Protocol (IP) address associated with UE 110, and/or another type of user device identifier.

Carrier aggregation settings field 520 may include information identifying one or more carrier aggregation settings for the particular UE 110. For example, carrier aggregation settings field 520 may identify whether the particular UE 110 is enabled for carrier aggregation, how many secondary component carriers can be activated for the particular UE 110, which particular bands and/or carriers can be activated for the particular UE 110, whether carrier aggregation is currently configured for the particular UE 110, whether carrier aggregation has been de-configured for the particular UE 110, and/or other types of configuration settings information.

Primary component carrier field 530 may store information identifying a particular band and/or carrier selected as the primary component carrier for the particular UE. Primary component carrier quality field 540 may store information relating to one or more determined quality levels for the primary component carrier for the particular UE. For example, primary component carrier quality field 540 may store a downlink RSRP/RSRQ and/or rBLER value, an uplink rBLER value, a power head room value, an estimated path loss value, and/or other quality level values.

Each second component carrier field 550 may store information relating to a particular secondary component carrier activated for the particular UE 110. Second component carrier field 550 may include secondary component carrier ID field 552 and a secondary component carrier quality field 554. Secondary component carrier ID field 552 may store information identifying a particular band and/or carrier associated with the particular secondary component carrier. Furthermore, secondary component carrier ID field 552 may include information indicating whether the secondary component carrier has been activated. Secondary component carrier quality field 554 may store information relating to one or more determined quality levels for the particular secondary component carrier, such as an rBLER value.

Although FIG. 5 shows exemplary components of UE DB 440, in other implementations, UE DB 440 may include fewer components, different components, differently arranged components, or additional components than depicted in FIG. 5.

Figure 6:
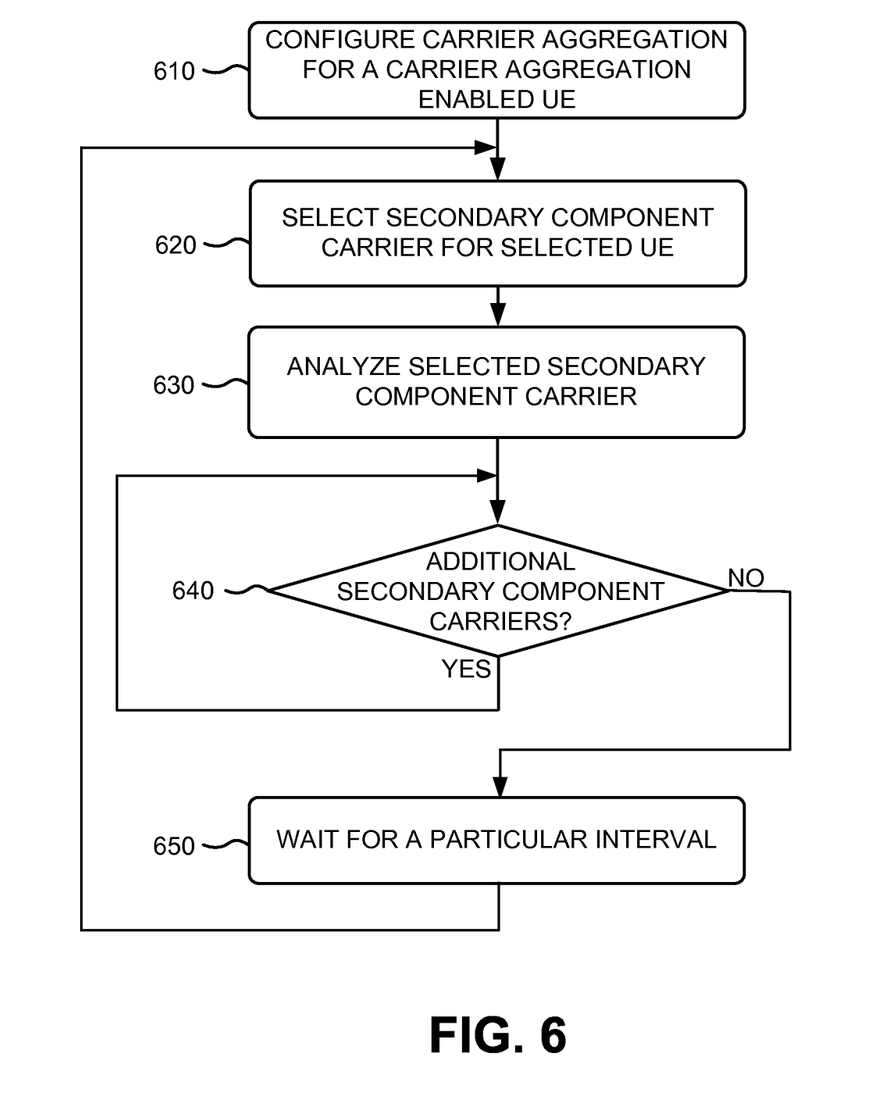
FIG. 6 is a flowchart for managing secondary component carriers according to an implementation described herein.

FIG. 6 is a flowchart for managing secondary component carriers according to an implementation described herein. In one implementation, the process of FIG. 6 may be performed by eNodeB 120. In other implementations, another device or a group of devices separate from and/or including eNodeB 120 may perform some or all of the process of FIG. 6. For example, some or all of the process of FIG. 6 may be performed by UE 110.

The process of FIG. 6 may include configuring carrier aggregation for a carrier aggregation enabled UE (block 610). For example, UE 110 may attach to eNodeB 120 and eNodeB 120 may determine that UE 110 is enabled for carrier aggregation and may configure carrier aggregation for UE 110. After configuring carrier aggregation, eNodeB 120 may activate one or more secondary component carriers for UE 110 based on carrier aggregation settings associated with UE 110. For example, the carrier aggregation settings for UE 110 may indicate how many secondary component carriers UE 110 and enodeB 120 may support in a carrier aggregation mode. eNodeB 120 may configure, or re-configure, UE 110 for carrier aggregation when the Radio Resource Control (RCC) for UE 110 becomes active from an idle state. Furthermore, UE 110 may be configured or re-configured for carrier aggregation when UE 110 is handed over to another eNodeB 120 as a result of a mobility, coverage, or load balancing trigger.

A secondary component carrier may be selected for the selected UE (block 620). For example, carrier aggregation manager 401 may access secondary component carrier records 550 for UE 110 and may select an activated secondary component carrier for analysis. The selected secondary component carrier may be analyzed (block 630). For example, eNodeB 120 may determine whether to de-activate the selected secondary component carrier, whether to switch to a different primary component carrier, and/or whether to de-configure carrier aggregation (e.g., see FIG. 7).

A determination may be made as to whether there are additional secondary component carriers that have been activated (block 640). For example, carrier aggregation manager 401 may access secondary component carrier fields 550 for UE 110 to determine whether there are additional secondary component carriers that have been activated. If there are additional secondary component carriers (block 640—YES), processing may return to block 620 to select another secondary component carrier. Thus, blocks 620 and 630 may be performed for each activated secondary component carrier for UE 110. If there are no additional secondary component carriers (block 640—NO), processing may proceed to block 650 to wait for a particular interval. After waiting the particular intervals, processing may return to block 640 to activate additional secondary component carriers.

Figure 7:
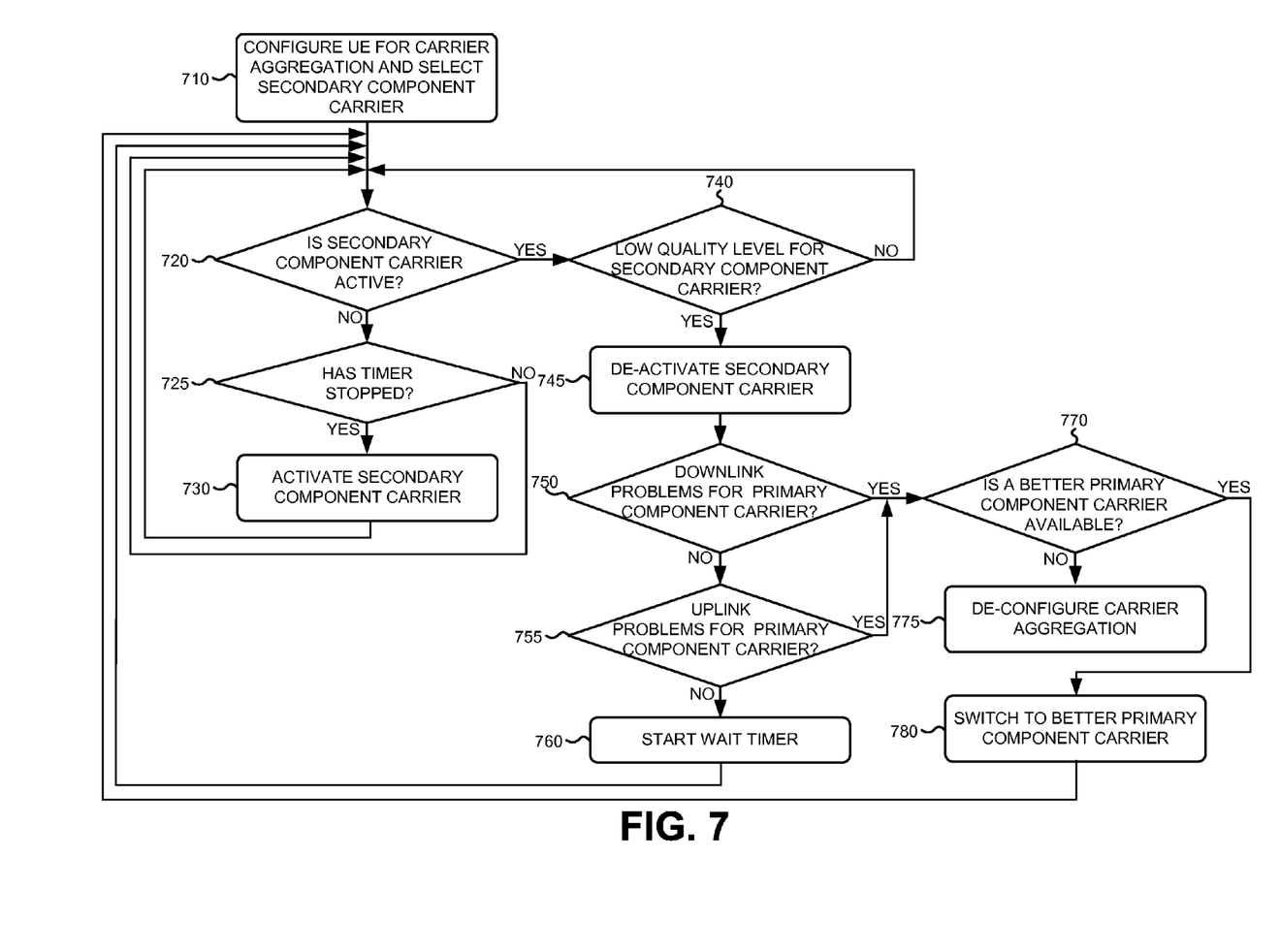
FIG. 7 is a flowchart for managing carrier aggregation according to an implementation described herein.

FIG. 7 is a flowchart for managing carrier aggregation according to an implementation described herein. In one implementation, the process of FIG. 7 may be performed by eNodeB 120. In other implementations, another device or a group of devices separate from and/or including eNodeB 120 may perform some or all of the process of FIG. 7. For example, some or all of the process of FIG. 7 may be performed by UE 110.

The process of FIG. 7 may include configuring UE for carrier aggregation and selecting a secondary component carrier (block 710). For example, as explained above in connection with block 610 of FIG. 6, UE 110 may attach to eNodeB 120 and eNodeB 120 may determine that UE 110 is enabled for carrier aggregation and may configure carrier aggregation for UE 110. eNodeB 120 may then select a secondary component carrier from secondary component carrier fields 550 of UE record 440.

A determination may be made as to whether the secondary component carrier is active (block 720). For example, carrier aggregation manager 401 may access secondary component carrier field 550 of UE record 440 for the selected secondary component carrier to determine whether the secondary component carrier has been activated. If it is determined that the secondary component carrier has not been activated (block 720—NO), a determination may be made as to whether a secondary component carrier timer has stopped (block 725). A secondary component carrier timer may be set upon initiation of carrier aggregation configuration. The secondary component carrier timer may ensure that carrier aggregation configuration has been completed before activating a secondary component carrier. Additionally or alternatively, a timer may be set to ensure that the process of FIG. 7 is performed at particular intervals.

If it is determined that the secondary component carrier timer has not stopped (block 725—NO), processing may return to block 720. If it is determined that the secondary component carrier timer has stopped (block 725—YES), the secondary component carrier may be activated (block 730). For example, eNodeB 120 may instruct UE 110 to activate the secondary component carrier and may update secondary component carrier field 550 of UE record 440.

Returning to block 720, if it is determined that the secondary component carrier has been activated (block 720—YES), processing may continue to determine whether there is a low quality level for secondary component carrier (block 740). Carrier quality calculator 430 may determine whether a quality level associated with the secondary component carrier is below a quality level threshold. For example, carrier quality calculator 430 may determine the rBLER for the secondary component carrier and may determine whether the rBLER is higher than an rBLER threshold. Additionally or alternatively, carrier quality calculator 430 may determine other BLER criteria, such as an initial or first transmission BLER, a second transmission BLER, and/or other transmission BLER measurements.

If it is determined that the secondary component carrier is not associated with a low quality level (block 740—NO), processing may return to block 720. If it is determined that the secondary component carrier is associated with a low quality level (block 740—YES), the secondary component carrier may be de-activated (block 745). For example, eNodeB 120 may instruct UE 110 to de-activate the secondary component carrier and may update secondary component carrier field 550 of UE record 440.

A determination may then be made as to whether there are downlink problems for the primary component carrier (block 750). As an example, carrier quality calculator 430 may determine whether a downlink quality level associated with the primary component carrier is below a quality level threshold. For example, carrier quality calculator 430 may determine the downlink rBLER for the primary component carrier and may determine whether the downlink rBLER is higher than the downlink rBLER threshold. Additionally or alternatively, primary component carrier manager 410 may configure UE 110 to measure RSRP and/or RSRQ for the current primary component carrier and to report RSRP and/or RSRQ values at particular intervals or if the RSRP and/or RSRQ values go below a particular threshold.

In some implementations, primary component carrier manager 410 may further determine whether a load level associated with the primary component carrier is higher than a load threshold. A load level may be identified based on a number of UE sessions associated with a band and/or carrier, based on a load capacity associated with a band and/or carrier, based on a number of available resource blocks for a band and/or carrier, and/or based on another measure of load associated with a band and/or carrier.

If it is determined that there are downlink problems for the primary component carrier (block 750—YES), processing may continue to determine whether a better primary component carrier is available (block 770). For example, primary component carrier manager 410 may access carrier aggregation settings field 520 to determine other primary component carriers available for UE 110. For each available primary component carrier, primary component carrier manager 410 may determine whether a quality level associated with the available primary component carrier is higher than the downlink quality level. In some implementations, primary component carrier manager 410 may further determine whether a load level associated with the available primary component carrier is lower than a load threshold. In some implementations, eNodeB 120 may instruct UE 110 to identify a better primary component carrier by, for example, measuring RSRP and/or RSRQ values for prospective new primary component carrier and to select the best available primary component carrier based on the measured values for each available primary component carrier.

If it is determined that a better primary component carrier is available (block 770—YES), eNodeB 120 may switch to the better primary component carrier for UE 110 (block 780) and processing may return to block 720. For example, eNodeB 120 may instruct UE 110 to switch to the selected primary component carrier. As an example, if the current primary component carrier is on the AWS (2100 MHz) spectrum, but a new primary component carrier is available on the 700 MHz spectrum, the primary component carrier may be switched to the 700 MHz spectrum, since RF propagation is better on the 700 MHZ spectrum than the 2100 MHz spectrum.

If it is determined that a better primary component carrier is not available (block 770—NO), carrier aggregation may be de-configured for UE 110. For example, carrier aggregation manager 410 may update carrier aggregation settings 520 of UE record 440 to indicate that carrier aggregation has been de-configured and may instruct UE 110 to de-configure carrier aggregation and to only use one carrier for communicating with eNodeB 120.

For example, a high downlink rBLER one or more component carriers may indicate coverage issues for uplink control and/or data carriers in noise limited areas and downlink control channel issues on a particular component carrier in interference limited areas. Similarly, a high uplink rBLER may indicate uplink and downlink control and/or data coverage issues for the primary component carrier. Thus, when a high rBLER on either a downlink or uplink carrier is observed, it may be advisable to de-configure carrier aggregation to alleviate coverage impact. De-configuration of carrier aggregation for UE 110 may bring UE 110 into single carrier mode.

In some implementations, eNodeB 120 may also measure and observe long-term (e.g., averaged over a particular period of time) carrier quality, as determined, for example, by a signal to interference ratio (SINR) on PUSCH and/or PUCCH of the primary component carrier. eNodeB 120 may trigger carrier aggregation de-configuration if the SINR values of one or both of PUSCH and/or PUCCH goes below a particular threshold. The long term SINR value for a carrier going below the particular threshold may indicate that eNodeB 120 is not able to decode and/or extract ACK/NACK messages sent by UE 110 with the necessary error probability (e.g., a 0.1% error rate). Furthermore, eNodeB 120 may also estimate the carrier quality of downlink PDCCH and/or downlink PDSCH on the primary component carrier based on the carrier state information associated with UE 110 and may determine whether to de-configure carrier aggregation based on this information. Furthermore, eNodeB 120 may configure UE 110 to measure RSRP and/or RSRQ for the primary component carrier and to report the measured values to eNodeB 120 and eNodeB 120 may determine whether to de-configure carrier aggregation based on these values. Moreover, eNodeB 120 may also select to de-configure carrier aggregation when the power headroom report for UE 110 indicates that the power headroom is below a threshold or when the estimated path loss on the uplink for UE 110 is above a threshold.

Returning to block 750, if it is determined that there are no downlink problems for the primary component carrier (block 750—NO), processing may continue to determine whether there are any uplink problems for the primary component carrier (block 755). As an example, carrier quality calculator 430 may determine the uplink rBLER for the primary component carrier and may determine whether the uplink rBLER is higher than an uplink rBLER threshold. As another example, carrier quality calculator 430 may determine an uplink estimated uplink path loss for the primary component carrier and may determine whether the uplink estimated uplink path loss is higher than an uplink estimated uplink path loss threshold. As yet another example, carrier quality calculator 430 may determine an uplink power head room for the primary component carrier and may determine whether the uplink power head room is higher than an uplink power head room threshold. In some implementations, primary component carrier manager 410 may further determine whether a load level associated with the uplink of primary component carrier is higher than an uplink load threshold.

If it is determined that there are uplink problems for the primary component carrier (block 755—YES), processing may continue to block 770 to determine whether a better primary component carrier is available, as described above. If it is determined that there are no uplink problems for the primary component carrier (block 755—NO), a wait timer may be started (block 760) to ensure that the process of FIG. 7 is performed at particular intervals and processing may return to block 720.

While blocks 750, 755, 760, 770, 775, and 780 are shown in FIG. 7 as being performed after block 745, in other implementations, some or all of blocks 750, 755, 760, 770, 775, and 780 may be performed in parallel and/or independently of blocks 720, 725, 730, 740, and/or 745.

Figure 8:
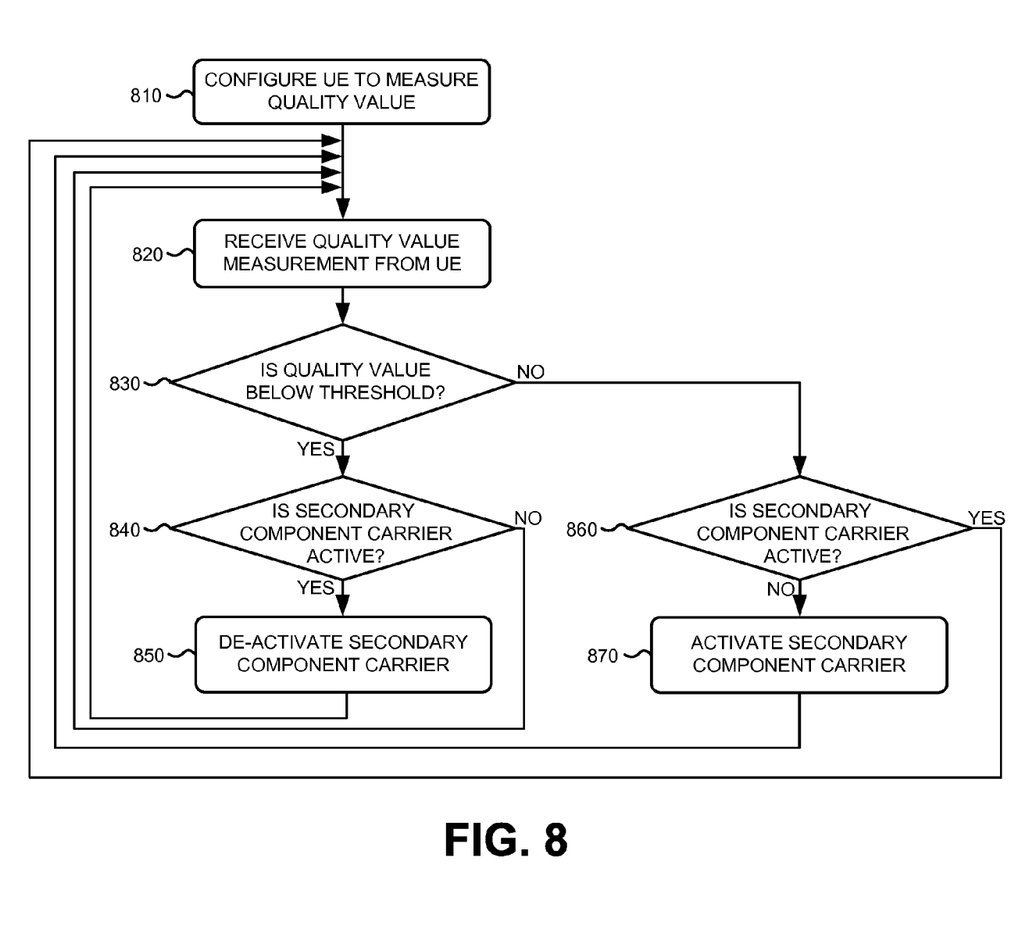
FIG. 8 is a flowchart for activating and de-activating a secondary component carrier according to an implementation described herein.

FIG. 8 is a flowchart for activating and de-activating a secondary component carrier according to an implementation described herein. The process of FIG. 8 may be performed additionally or alternatively to the process of FIG. 7. In one implementation, the process of FIG. 8 may be performed by eNodeB 120. In other implementations, another device or a group of devices separate from and/or including eNodeB 120 may perform some or all of the process of FIG. 8. For example, some or all of the process of FIG. 8 may be performed by UE 110.

The process of FIG. 8 may include configuring a UE to measure a quality value (block 810). Secondary component carrier manager 420 may configure carrier quality calculator 430 to instruct UE 110 to report one or more particular quality values, such as, for example, RSRP and/or RSRQ. RSRP measures the average received power over resource elements that carry cell-specific reference signals within a particular bandwidth. RSRQ indicates the quality of a received reference signal and is defined as RSRQ= (N*RSRP)/(Carrier Receive Strength Signal Indicator (RSSI)), where N is a normalization factor to ensure that the nominator and denominator are measures over the same bandwidth and where the carrier RSSI measures the average total received power in symbols that include reference symbols in the measurement bandwidth over N resource blocks. Additionally or alternatively, carrier quality calculator 430 may be configured to estimate the channel quality of downlink control channel (PDCCH) and/or downlink data channel (PDSCH) for the secondary component carrier based on the UE's channel state information.

A quality value measurement may be received from the UE (block 820) and a determination may be made as to whether the quality value measurement is below a threshold (block 830). For example, carrier quality calculator 430 may receive an RSRP, RSRQ, PDCCH channel quality, PDSCH channel quality, and/or another channel quality measurement from UE 110 and may determine whether the received quality value measurement is below a threshold maintained by carrier aggregation manager 401 (e.g., stored in carriers DB 450) for the particular quality value for the particular carrier of the secondary component carrier.

If the quality value measurement is below the threshold (block 830—YES), a determination may be made as to whether the secondary component carrier is active (block 840). For example, secondary component carrier component 420 may access second component carrier fields 550 to determine whether the secondary component carrier is active. If the secondary component carrier is active (block 840—YES), the secondary component carrier may be de-activated (block 850). For example, eNodeB 120 may detect a coverage alarm for the secondary component carrier, may instruct UE 110 to de-activate the secondary component carrier, and may update secondary component carrier field 550 of UE record 440. Processing may return to block 820 to receive another quality value measurement from the UE. Another quality value measurement may be received after a particular time interval. If the secondary component carrier is not active (block 840—NO), processing may also return to block 820 to receive another quality value measurement from the UE.

Returning to block 830, if the quality value measurement is not below the threshold (block 860—NO), a determination may be made as to whether the secondary component carrier is active (block 860). For example, secondary component carrier component 420 may access second component carrier fields 550 to determine whether the secondary component carrier is active. If the secondary component carrier is not active (block 840—NO), the secondary component carrier may be activated or re-activated (block 870). For example, eNodeB 120 may instruct UE 110 to activate the secondary component carrier and may update secondary component carrier field 550 of UE record 440. If the secondary component carrier has been previously de-activated because of a coverage alarm, eNodeB 120 may determine that UE 110 has come out of the coverage alarm for the secondary component carrier and may re-activate the secondary component carrier. Processing may return to block 820 to receive another quality value measurement from the UE. If the secondary component carrier is active (block 860—YES), processing may also return to block 820 to receive another quality value measurement from the UE.

Figure 9:
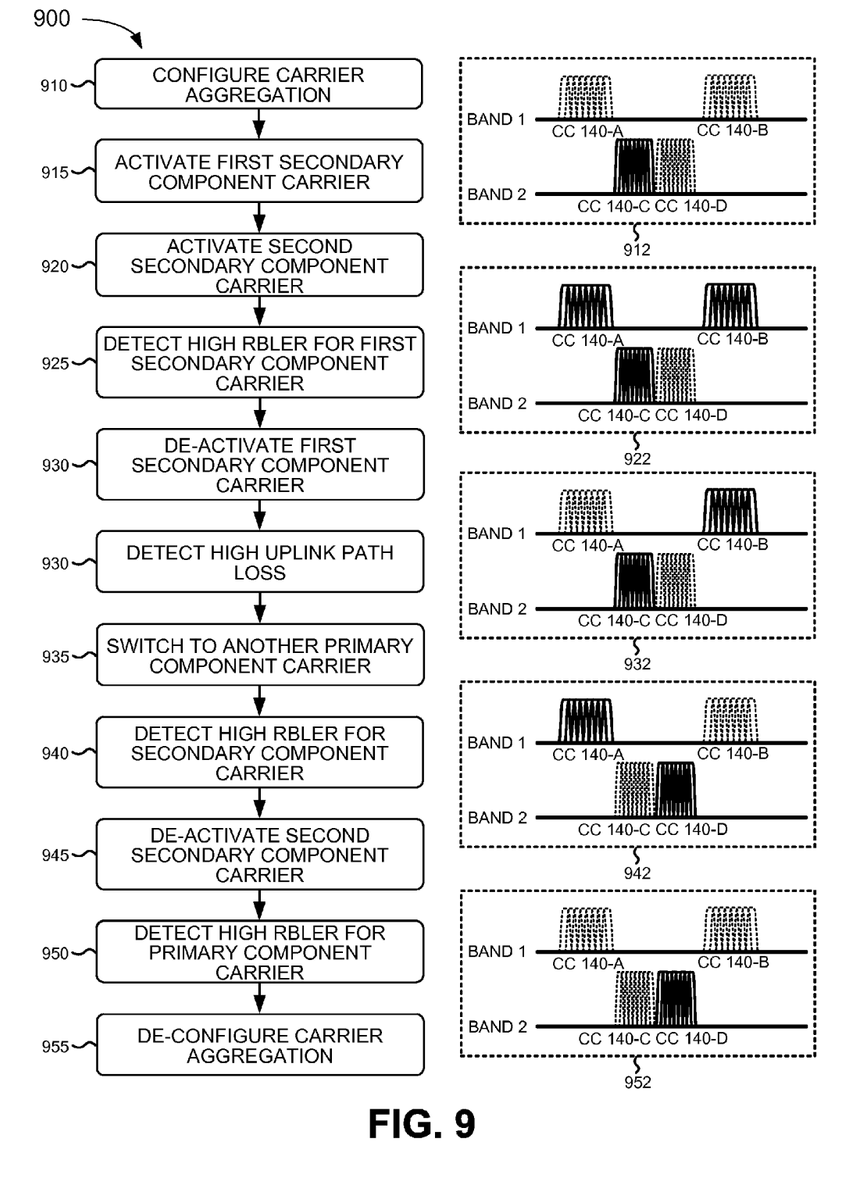
FIG. 9 is a diagram of an exemplary carrier aggregation management scenario according to an implementation described herein.

FIG. 9 is a diagram of an exemplary carrier aggregation management scenario 900 according to an implementation described herein. Scenario 900 may include configuring carrier aggregation for a UE 100 (block 910). When carrier aggregation is configured, component carrier 140-C may be selected as the primary component carrier (item 912). After carrier aggregation is configured, eNodeB 120 may activate a first secondary component carrier (block 915) and may activate a second secondary component carrier (block 920). For example, component carrier 140-A may be selected as the first secondary component carrier and component carrier 140-B may be selected as the second secondary component carrier (item 922).

Assume UE 110 is moving away from eNodeB 120 and is moving out of the transmission range of band 1. Thus, eNodeB 120 may detect a high rBLER for the first secondary component carrier 140-A (block 925) and may, in response, de-activate the first secondary component carrier 140-A (block 930). This may result in UE 110 using component carrier 140-C as the primary component carrier and component carrier 140-B as a single secondary component carrier (item 932).

At a later time, as UE 110 continues to move away from eNodeB 120, eNodeB 120 may detect a high uplink path loss for the primary component carrier (block 930) and, in response, eNodeB 120 may switch to another primary component carrier (block 935). For example, eNodeB 120 may switch the primary component carrier from component carrier 140-C to component carrier 140-D (item 942).

UE 110 may continue to move away from eNodeB 120, and eNodeB 120 may detect a high rBLER for the second secondary component carrier 140-B (block 940) and may, in response, de-activate the second secondary component carrier 140-B (block 945). This may result in UE 110 only using component carrier 140-D as the primary component carrier (item 952). Furthermore, eNodeB 120 may detect a high rBLER for the primary component carrier (now component carrier 140-D) (block 950) and may determine that another primary component carrier is not available. In response, eNodeB 120 may de-activate carrier aggregation for UE 110 (block 955).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6-9, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a base station device, the method comprising:
    configuring, by the base station device, carrier aggregation for a user equipment serviced by the base station device;
    activating, by the base station device, a secondary component carrier for the user equipment upon detecting that a timer expired;
    determining, by the base station device, that a quality level for the secondary component carrier is lower than a quality threshold, wherein determining that the quality level for the secondary component carrier is lower than a quality threshold includes:
        determining that a residual block error rate for the secondary component carrier is higher than a residual block error rate threshold;
    de-activating, by the base station, the secondary component carrier for the user equipment, in response determining that the quality level for the secondary component carrier is lower than the quality threshold;
    determining, by the base station, whether a problem associated with a primary component carrier for the user equipment is detected;
    switching, by the base station and in response to determining that the problem is detected, to a better primary component carrier that is associated with a higher quality level than the primary component carrier, when the better primary component carrier is available;
    de-configuring, by the base station and in response to determining that the problem is detected, carrier aggregation for the user equipment, when the better primary component carrier is not available; and
    restarting, by the base station, the timer, when the problem associated with the primary component carrier for the user equipment is not detected.

2. The method of claim 1, further comprising:
    activating a second secondary component carrier for the user equipment;
    determining that a second quality level for the second secondary component carrier is lower than a second quality threshold; and
    de-activating, by the base station, the second secondary component carrier for the user equipment, in response to determining that the second quality level for the second secondary component carrier is lower than the second quality threshold.

3. The method of claim 1, wherein determining whether a problem associated with a primary component carrier for the user equipment is detected includes:
    determining that a quality level for a downlink for the primary component carrier is lower than a downlink quality threshold; and
    determining that the problem associated with the primary component carrier for the user equipment is detected based on determining that the quality level for the downlink for the primary component carrier is lower than the downlink quality threshold.

4. The method of claim 3, wherein determining that the quality level for the downlink for the primary component carrier is lower than the downlink quality threshold includes:
    determining that a residual block error rate for the primary component carrier is higher than the residual block error rate threshold.

5. The method of claim 1, wherein determining whether a problem associated with a primary component carrier for the user equipment is detected includes:
    determining that a load level for a downlink for the primary component carrier is higher than a downlink load threshold; and
    determining that the problem associated with the primary component carrier for the user equipment is detected based on determining that the load level for the downlink for the primary component carrier is higher than the downlink load threshold.

6. The method of claim 1, wherein determining whether a problem associated with a primary component carrier for the user equipment is detected includes:
determining that an uplink quality level for an uplink for the primary component carrier is lower than an uplink quality threshold; and
determining that the problem associated with the primary component carrier for the user equipment is detected based on determining that the load level for the uplink for the primary component carrier is lower than the uplink quality threshold.

7. The method of claim 6, wherein the uplink quality level is based on at least one of:
an uplink residual block error rate;
an estimated uplink path loss; or
an uplink power head room.

8. The method of claim 1, wherein determining that the quality level for the secondary component carrier is lower than the quality threshold further includes:
receiving, from the user equipment, a quality level measurement including at least one of:
a Reference Signal Received Power measurement,
a Reference Signal Received Quality measurement,
an estimated channel quality of a physical downlink control channel, or
an estimated quality of a physical downlink shared channel; and
determining that the received quality level measurement is below a quality level threshold.

9. The method of claim 8, further comprising:
receiving, from the user equipment, a second quality level measurement after a particular time;
determining that the received second quality level measurement is not below the quality level threshold; and
re-activating the secondary component carrier for the user equipment, in response to determining that the received second quality level measurement is not below the quality level threshold.

10. A computer device comprising:
logic configured to:
configure carrier aggregation for a user equipment serviced by a base station device;
activate a secondary component carrier for the user equipment upon detecting that a timer expired;
determine that a quality level for the secondary component carrier is lower than a quality threshold, wherein determining that the quality level for the secondary component carrier is lower than a quality threshold includes: determining that a residual block error rate for the secondary component carrier is higher than a residual block error rate threshold;
de-activate the secondary component carrier for the user equipment, in response determining that the quality level for the secondary component carrier is lower than the quality threshold;
determine whether a problem associated with a primary component carrier for the user equipment is detected;
switch, in response to determining that the problem is detected, to a better primary component carrier that is associated with a higher quality level than the primary component carrier, when the better primary component carrier is available;
de-configure, in response to determining that the problem is detected, carrier aggregation for the user equipment, when the better primary component carrier is not available; and
restart the timer, when the problem associated with the primary component carrier for the user equipment is not detected.

11. The computer device of claim 10, wherein, when determining whether a problem associated with a primary component carrier for the user equipment is detected, the logic is further configured to:
determine that a quality level for a downlink for the primary component carrier is lower than a downlink quality threshold; and
determine that the problem associated with the primary component carrier for the user equipment is detected based on determining that the quality level for the downlink for the primary component carrier is lower than the downlink quality threshold.

12. The computer device of claim 11, wherein, when determining that the quality level for the downlink for the primary component carrier is lower than the downlink quality threshold, the logic is further configured to:
determine that a residual block error rate for the primary component carrier is higher than the residual block error rate threshold.

13. The computer device of claim 10, wherein, when determining whether a problem associated with a primary component carrier for the user equipment is detected, the logic is further configured to:
determine that a load level for a downlink for the primary component carrier is higher than a downlink load threshold; and
determine that the problem associated with the primary component carrier for the user equipment is detected based on determining that the load level for the downlink for the primary component carrier is higher than the downlink load threshold.

14. The computer device of claim 10, wherein, when determining whether a problem associated with a primary component carrier for the user equipment is detected, the logic is further configured to:
determine that an uplink quality level for an uplink for the primary component carrier is lower than an uplink quality threshold; and
determine that the problem associated with the primary component carrier for the user equipment is detected based on determining that the load level for the uplink for the primary component carrier is lower than the uplink quality threshold.

15. The computer device of claim 14, wherein the uplink quality level is based on at least one of:
an uplink residual block error rate;
an estimated uplink path loss; or
an uplink power head room.

16. The computer device of claim 10, wherein, when determining that the quality level for the secondary component carrier is lower than the quality threshold, the logic is further configured to:
receive, from the user equipment, a quality level measurement including at least one of:
a Reference Signal Received Power measurement,
a Reference Signal Received Quality measurement,
an estimated channel quality of a physical downlink control channel, or
an estimated quality of a physical downlink shared channel; and determine that the received quality level measurement is below a quality level threshold.

17. The computer device of claim 16, wherein the logic is further configured to:
receive, from the user equipment, a second quality level measurement after a particular time;
determine that the received second quality level measurement is not below the quality level threshold; and
re-activate the secondary component carrier for the user equipment, in response to determining that the received second quality level measurement is not below the quality level threshold.

18. A non-transitory computer-readable memory device storing instructions executable on one or more processors, the non-transitory computer-readable memory device comprising:
one or more instructions to configure carrier aggregation for a user equipment serviced by a base station device;
one or more instructions to activate a secondary component carrier for the user equipment upon detecting that a timer expired;
one or more instructions to determine that a quality level for the secondary component carrier is lower than a quality threshold, wherein the one or more instructions to determine that the quality level for the secondary component carrier is lower than a quality threshold include: one or more instructions to determine that a residual block error rate for the secondary component carrier is higher than a residual block error rate threshold;
one or more instructions to de-activate the secondary component carrier for the user equipment, in response determining that the quality level for the secondary component carrier is lower than the quality threshold;
one or more instructions to detect a problem associated with a primary component carrier for the user equipment;
one or more instructions to determine whether a better primary component carrier for the user equipment is available, in response to detecting the problem associated with the primary component carrier;
one or more instructions to switch to the better primary component carrier that is associated with a higher quality level than the primary component carrier, when the better primary component carrier is available;
one or more instructions to de-configure carrier aggregation for the user equipment, when the better primary component carrier for the user equipment is not available; and
one or more instructions to restart the timer, when the problem associated with the primary component carrier for the user equipment is not detected.

19. The non-transitory computer-readable memory device of claim 18, wherein the one or more instructions to detect a problem associated with a primary component carrier for the user equipment include at least one of:
one or more instructions to determine that a quality level for a downlink for the primary component carrier is lower than a downlink quality threshold;
one or more instructions to determine that a load level for a downlink for the primary component carrier is higher than a downlink load threshold; or
one or more instructions to determine that an uplink quality level for an uplink for the primary component carrier is lower than an uplink quality threshold.

20. The non-transitory computer-readable memory device of claim 18, wherein the one or more instructions to determine that a quality level for the secondary component carrier is lower than a quality threshold further include:
one or more instructions to receive, from the user equipment, a quality level measurement including at least one of:
a Reference Signal Received Power measurement,
a Reference Signal Received Quality measurement,
an estimated channel quality of a physical downlink control channel, or
an estimated quality of a physical downlink shared channel; and
one or more instructions to determine that the received quality level measurement is below a quality level threshold.

* * * * *